US008602690B2

(12) United States Patent
Mitri

(10) Patent No.: US 8,602,690 B2
(45) Date of Patent: Dec. 10, 2013

(54) SLEEVED CABLE BOLT

(76) Inventor: Hani Sabri Mitri, Saint-Lambert (CA)

( * ) Notice: Subject to any disclaimer, the term of this patent is extended or adjusted under 35 U.S.C. 154(b) by 266 days.

(21) Appl. No.: 13/123,398

(22) PCT Filed: Dec. 21, 2009

(86) PCT No.: PCT/CA2009/001883
§ 371 (c)(1),
(2), (4) Date: Apr. 8, 2011

(87) PCT Pub. No.: WO2010/072000
PCT Pub. Date: Jul. 1, 2010

(65) Prior Publication Data
US 2011/0194902 A1 Aug. 11, 2011

Related U.S. Application Data

(60) Provisional application No. 61/203,328, filed on Dec. 23, 2008.

(51) Int. Cl.
*E21D 20/00* (2006.01)

(52) U.S. Cl.
USPC ............................. 405/259.1; 405/259.5

(58) Field of Classification Search
USPC ........................................ 405/259.1–259.6
See application file for complete search history.

(56) References Cited

U.S. PATENT DOCUMENTS

| 3,407,685 A | 10/1968 | Prince |
| 4,140,428 A | 2/1979 | McLain et al. |
| 4,369,003 A | 1/1983 | Brandstetter |
| 4,440,526 A | 4/1984 | Koppers et al. |
| 4,518,292 A * | 5/1985 | Calandra, Jr. ............. 405/259.3 |
| 4,523,880 A | 6/1985 | Isler |
| 4,528,792 A * | 7/1985 | Cross et al. ..................... 52/704 |
| 4,634,317 A | 1/1987 | Skogberg et al. |
| 4,798,501 A | 1/1989 | Spies |
| 4,884,377 A | 12/1989 | Matt |
| 4,984,937 A | 1/1991 | Karpellus |
| 5,525,013 A | 6/1996 | Seegmiller et al. |
| 5,531,545 A | 7/1996 | Seegmiller et al. |

(Continued)

FOREIGN PATENT DOCUMENTS

| CA | 2107826 | 4/1999 |
| CA | 2194818 | 3/2006 |

(Continued)

OTHER PUBLICATIONS

International Search Report of PCT/CA2009/001883; Feb. 19, 2010; Adeeb Zarifa.

(Continued)

*Primary Examiner* — John Kreck
(74) *Attorney, Agent, or Firm* — Osler, Hoskin & Harcourt LLP

(57) ABSTRACT

A cable bolt has a multi-strand cable, and a sleeve having at least one open end. The sleeve has an outer surface and an inner surface. The outer surface of the sleeve is at least partially threaded. An end portion of the multi-strand cable is disposed inside the sleeve. A bonding material is disposed between the inner surface of the sleeve and an outer surface of the end portion of the multi-strand cable. The bonding material bonds the sleeve to the multi-strand cable.

17 Claims, 10 Drawing Sheets

(56) References Cited

U.S. PATENT DOCUMENTS

| | | |
|---|---|---|
| 5,586,839 A | 12/1996 | Gillespie |
| 5,954,455 A | 9/1999 | Eaton et al. |
| 6,039,509 A * | 3/2000 | Locotos ................ 405/302.2 |
| 6,390,735 B1 | 5/2002 | Gaudreau et al. |
| 6,428,243 B1 | 8/2002 | Hutchins |
| 7,147,404 B2 | 12/2006 | Spearing et al. |
| 7,338,234 B2 | 3/2008 | Rataj et al. |
| 7,896,581 B2 * | 3/2011 | Fox ........................ 405/259.5 |
| 2009/0191007 A1 | 7/2009 | Seegmiller |

FOREIGN PATENT DOCUMENTS

| | | |
|---|---|---|
| GB | 864170 | 3/1961 |
| GB | 2 385 065 | 8/2003 |
| WO | 9519491 A1 | 7/1995 |

OTHER PUBLICATIONS

Communication pursuant to Rules 70(2) and 70a(2) EPC issued in respect of corresponding European Patent Application No. 09833985.6 on Apr. 19, 2013.

Extended European Search Report including the Supplementary European Search Report and the European Search Opinion issued in respect of corresponding European Patent Application No. 09833985.6 on Apr. 2, 2013.

Official Examination Report of corresponding Chilean Patent Application No. 1553-2011; Jan. 14, 2013; Antonio Del Rio Vega.

* cited by examiner

SLEEVED CABLE BOLT

CROSS-REFERENCE

The present application claims priority to U.S. Provisional patent application No. 61/203,328, filed Dec. 23, 2008, the entirety of which is incorporated herein by reference.

FIELD OF THE INVENTION

The present invention relates to cable bolts. More specifically the present invention relates to cable bolts used for rock support in mining and civil engineering applications.

BACKGROUND OF THE INVENTION

In tunnels and mines, the roof and walls of the excavation must be supported during the construction phase with anchors to reinforce the rock and keep it from falling. Rock anchors are installed by drilling holes in the rock and then inserting and fastening the rock anchor. The method of installation depends on the type of anchor. U.S. Pat. Nos. 4,798,501; 4,984,937; 5,531,545; 5,586,839; and 5,954,455 and United States Patent Publication 2009/0191007 A1 disclose various types of rock anchors.

Mechanical anchors are made from solid steel bars with threaded ends. One end has a nut thereon to become the bolt head and the other end (toe) receives an expansion shell (to fasten the toe upon spinning the bolt). Mechanical anchors are easily installed in the field since the installation procedure requires conventional drills, such as jackleg or stoper, to spin the nut on the bolt head once it is inserted in the drill hole. However, mechanical rock anchors are not as strong as cable bolts.

Cable bolts are made of multi-strand cables from high strength steel. Fastening the cable bolt in the bore hole is usually done by pushing the cable bolt behind one or more resin grout cartridges in the bore hole. By pushing and spinning the cable bolt into the bore hole, the resin grout cartridges rupture and the resin mixes and hardens. Spinning the cable is done with special mechanical devices designed to grip firmly on the portion of the cable bolt outside the bore hole and to spin it while pushing it. In order to secure the cable bolt head, the current practice of cable bolting as rock support system for tunnels and mines requires the use of a plate that is retained against the rock surface by a wedge and a barrel mounted on the cable bolt portion outside the bore hole to secure the bolt head at the rock surface.

One drawback of such cable bolts is that their installation is tedious and time consuming. It is a two-step procedure as it requires special jacking equipment to be brought in to push in the wedge inside the barrel. Another drawback is that it is cumbersome to apply tensioning to the cable bolt head with this method. Typically, tensioning is limited to a few metric tons (3 to 4) with this method. Furthermore, it is difficult to spin the cable bolt for resin mixing applications without the help of yet another special device in the form of a metal tube that fits the stranded body of the cable bolt portion outside the bore hole to force it to spin. This further increases the installation time and makes it more cumbersome.

Therefore, there is a need for a cable bolt that can easily be installed and tensioned.

SUMMARY OF THE INVENTION

It is an object of the present invention to ameliorate at least some of the inconveniences present in the prior art.

It is also an object of the present invention to provide a cable bolt having a sleeve disposed around an end portion of a multi-strand cable. An outer surface of the sleeve is at least partially threaded. A bonding material is disposed between an inner surface of the sleeve and the end portion of the multi-strand cable to bond the end portion of the multi-strand cable to the sleeve.

A plate is disposed around the threaded sleeve and a threaded fastener is disposed on the threaded sleeve. The sleeve, the end portion of the multi-strand cable, the bonding material, the plate, and the threaded fastener together form the bolt head of the cable bolt. Once the cable bolt is inserted inside a bore hole, the threaded fastener is tightened to bias the plate against the rock surrounding the bore hole. By tightening the threaded fastener, the cable bolt can be tensioned. This arrangement also permits the installation of the cable bolt using standard drilling equipment.

In one embodiment, the sleeve slips over the multi-strand cable upon application of a prescribed load on the plate, thus providing for a yieldable cable bolt.

In another embodiment, the shear strength of a bond between the inner surface of the sleeve and the outer surface of the end portion of the multi-strand cable is greater than a tensile strength of the cable.

In one aspect, the invention provides a cable bolt having a multi-strand cable, and a sleeve having at least one open end. The sleeve has an outer surface and an inner surface. The outer surface of the sleeve is at least partially threaded. An end portion of the multi-strand cable is disposed inside the sleeve. A bonding material is disposed between the inner surface of the sleeve and an outer surface of the end portion of the multi-strand cable. The bonding material bonds the sleeve to the multi-strand cable.

In a further aspect, the cable bolt has a plate having an aperture. The sleeve is disposed inside the aperture of the plate. An internally threaded fastener engages the at least partially threaded outer surface of the sleeve. The plate is disposed between the internally threaded fastener and a surface to be supported by the cable bolt when the cable bolt is installed.

In an additional aspect, when the cable bolt is installed, the internally threaded fastener biases the plate against the surface to be supported by the cable bolt to tension the cable bolt.

In a further aspect, the internally threaded fastener is a nut.

In an additional aspect, the bonding material includes one of resin grout, cement grout, and epoxy.

In a further aspect, the bonding material is expansive cement.

In an additional aspect, the bonding material undergoes volumetric expansion after setting.

In a further aspect, the sleeve has two open ends.

In an additional aspect, the multi-strand cable extends on both sides of the sleeve.

In a further aspect, the sleeve has one open end and one closed end. The end portion of the multi-strand cable disposed inside the sleeve includes an end of the multi-strand cable.

In an additional aspect, the sleeve slips over the multi-strand cable upon application of a prescribed load on the plate.

In a further aspect, an end of the multi-strand cable is disposed inside the sleeve once the sleeve has slipped.

In an additional aspect, a shear strength of a bond between the inner surface of the sleeve and the outer surface of the end portion of the multi-strand cable is greater than a tensile strength of the cable.

In a further aspect, the outer surface of the sleeve is fully threaded.

In an additional aspect, the bonding material is disposed between the entire inner surface of the sleeve and the entire outer surface of the end portion of the multi-strand cable disposed inside the sleeve.

In a further aspect, the outer surface and the inner surface of the sleeve are cylindrical.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
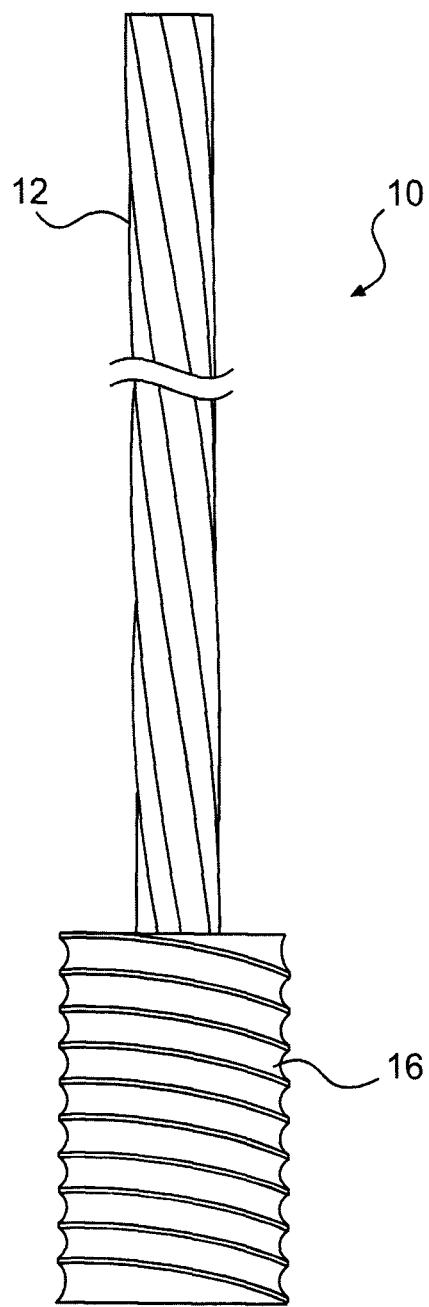
FIG. 1 is a side elevation of an embodiment of a cable bolt according to the present invention.

The cable bolt of the present invention will be described as being used in mining applications to support a roof of a mine or tunnel. However, it should be understood that other applications are contemplated. For example, the cable bolt could be used to support a wall of a mine or tunnel, or on the ground surface to help prevent slope sliding.

Turning to FIGS. 1 to 6, a first embodiment of a cable bolt 10 will be described. The cable bolt 10 consists of a multi-strand cable 12 having an end portion 14 disposed inside a cylindrical sleeve 16. A bonding material 18 is disposed between an inner surface of the sleeve 16 and an outer surface of the end portion 14 of the multi-strand cable 12 to bond the sleeve 16 to the multi-strand cable 12.

Figure 3:
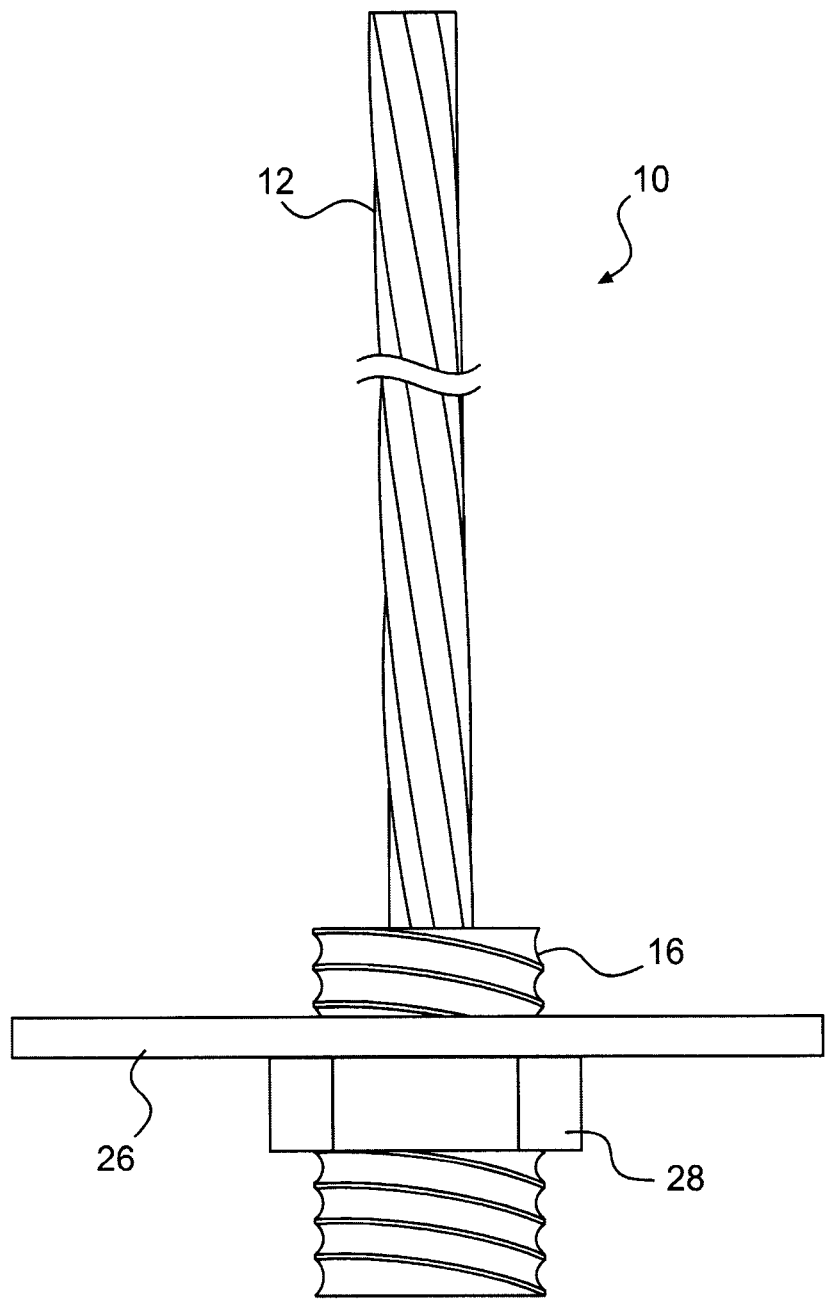
FIG. 3 is a side elevation view of the cable bolt of FIG. 1 with a plate and a nut disposed on a sleeve of the cable bolt.
Figure 4:
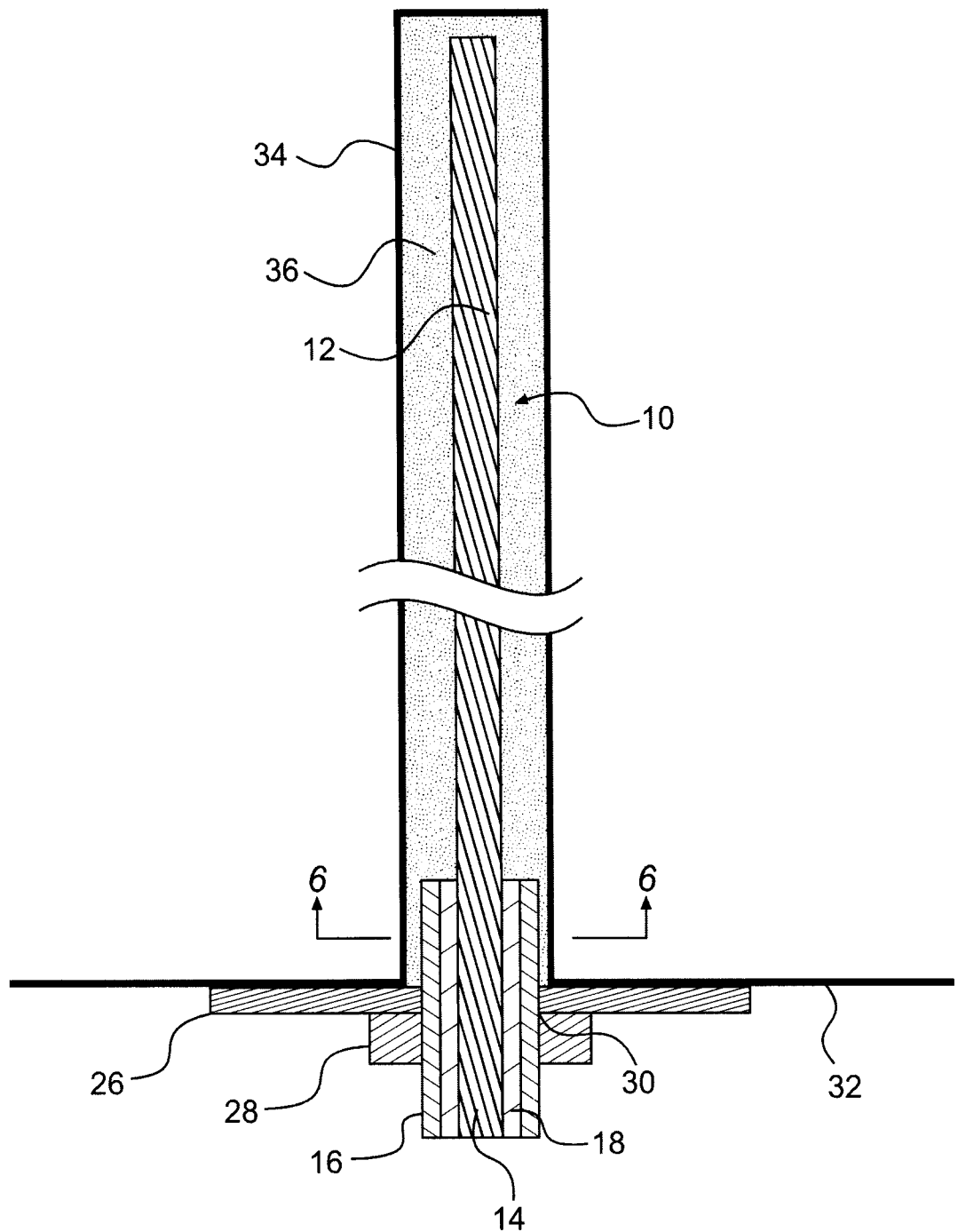
FIG. 4 is a schematic cross-sectional view of the cable bolt of FIG. 1 installed in a bore hole made in a roof of a mine.
Figure 6:
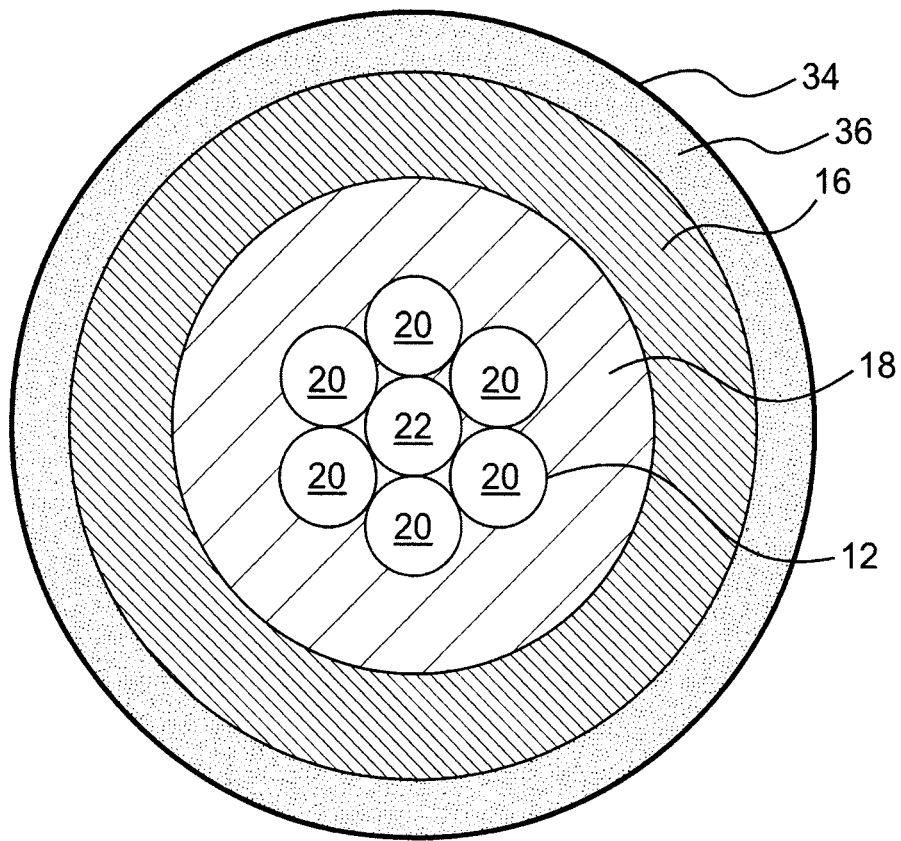
FIG. 6 is a cross-sectional view of the cable bolt and bore hole of FIG. 4 taken through line 6-6 of FIG. 4.

As can be seen in FIGS. 4 and 6, the outer and inner surfaces of the sleeve 16 are cylindrical and the sleeve 16 has two open ends. For mining applications, the sleeve 16 has a length between 101.6 mm (4 inches) and 203.2 mm (8 inches) and an inner diameter between 19.1 mm (¾ inch) and 25.4 mm (1 inch). However, it is contemplated that sleeves having other lengths and inner diameters could be used depending on the desired maximum load characteristic of the cable bolt as will be explained in greater detail below. As best seen in FIGS. 1 and 3, the outer surface of the sleeve 16 is fully threaded. It is contemplated that the outer surface of the sleeve 16 could be only partially threaded. It is contemplated that any type of thread could be used, such as whitworth, UNC, metric, square, T, or rope. In this embodiment, the sleeve 16 is made of steel; however other materials are contemplated such as fiber reinforced polymer (FRP).

The multi-strand cable 12 is made of six steel wires 20 wound around a central steel wire 22 as seen in FIG. 6. It is contemplated that the multi-strand cable 12 could be made of a different number of wires. As seen in FIG. 1, the multi-strand cable 12 is plain and undeformed along its entire length. However, it is contemplated that the portion of the cable 12 which extends above the sleeve 16 could be deformed at predetermined intervals to enhance the axial stiffness and resistance of this portion of the cable 12 as a support element when installed. For example, the cable 12 could be replaced with a cable 12' (FIG. 2) in which the wires 20 are deformed to form bulbs 24. Other shapes of deformations, such as a bird cage deformations, are also contemplated. The end portion 14 of the cable 12 disposed inside the sleeve 16 is plain and undeformed. Prior to applying the bonding material 18 between the cable 12 and the sleeve 16, the end portion 14 of the cable 12 should be clean and dry. The end portion 14 of the cable 12 can be cleaned using a sand-blaster for example.

To form the bolt head of the cable bolt 10, the end portion 14 of the cable 12 is generally centered inside the sleeve 16 and the bonding material 18 is inserted in the annulus formed between the inner surface of the sleeve 16 and the outer surface of the end portion 14 of the cable 12, as can be seen in FIG. 6. As can be seen in FIG. 4, the bonding material 18, once set, is disposed between the entire inner surface of the sleeve 16 and the entire outer surface of the end portion 14 of the cable 12 so as to completely fill the volume between the sleeve 16 and the end portion 14 of the cable 12. However, it is contemplated that this volume may not be completely filled. The bonding material 18 includes one of resin grout, cement grout, and epoxy, but other types of bonding materials are contemplated. The type of adhesive to be used depends, at least in part, on the desired strength of the bond between the sleeve 16 and the end portion 14 of the cable 12. The bonding material 18 preferably undergoes volumetric expansion after setting. One such bonding material 18 is expansive cement, such as type K, M or S portland cement, Prostar SCA™, Betonamit™, Bustar™, FRACT-AG™, Dā-mite™, and Dexpan™. The use of expansive cement results in increased pressure in the annulus on the outer surface of the end portion 14 of the cable 12 due to the tendency of the expansive cement to undergo a volumetric expansion in a confined area. The pressure on the end portion 14 of the cable 12 has the effect of heightening the frictional resistance at the interface between the end portion 14 of the cable 12 and the bonding material 18 and hence the resistance to tension load applied to the cable bolt 10 is increased.

As best seen in FIG. 3, the cable bolt 10 is also provided with a plate 26 and an internally threaded fastener, in the form of a nut 28. Although a nut 28 is shown in the present embodiment, other types of internally threaded fasteners are contemplated. The plate 26 has an aperture 30 (FIG. 4) therein to receive the sleeve 16. The nut 28 is fastened on the sleeve 16. As should be understood, the type of thread provided in the nut 28 is adapted to engage the type of thread provided on the outer surface of the sleeve 16. As can be seen in FIG. 4, the nut 28 is used to bias the plate 26 against the surface 32 of the roof of the mine or tunnel to be supported by the cable bolt 10. The sleeve 16, the end portion 14 of the multi-strand cable 12, the bonding material 18, the plate 26, and the nut 28 together form the bolt head of the cable bolt 10.

To install the cable bolt 10, a bore hole 34 (FIG. 4) is first drilled in the surface 32 of the roof of the mine or tunnel to be supported by the cable bolt 10. The cable 12 of the cable bolt 10 is then inserted in the bore hole 34 and the cable 12 is bonded to the inner surface of the bore hole 34 by a bonding material 36, such as a resin grout or other suitable material. The nut 28 is then tightened so as to bias the plate 26 against the surface 32. The level of tensioning of the cable bolt 10 can be adjusted by adjusting the amount of torque applied to the nut 28. Although the bore hole 34 is shown as having a larger diameter than the sleeve 16, it is contemplated that the bore hole 34 could have a smaller diameter than the sleeve 16 (but larger than the diameter of the cable 12) and that only the lower portion of the bore hole 34 could be enlarged to receive the sleeve 16.

Figure 7:
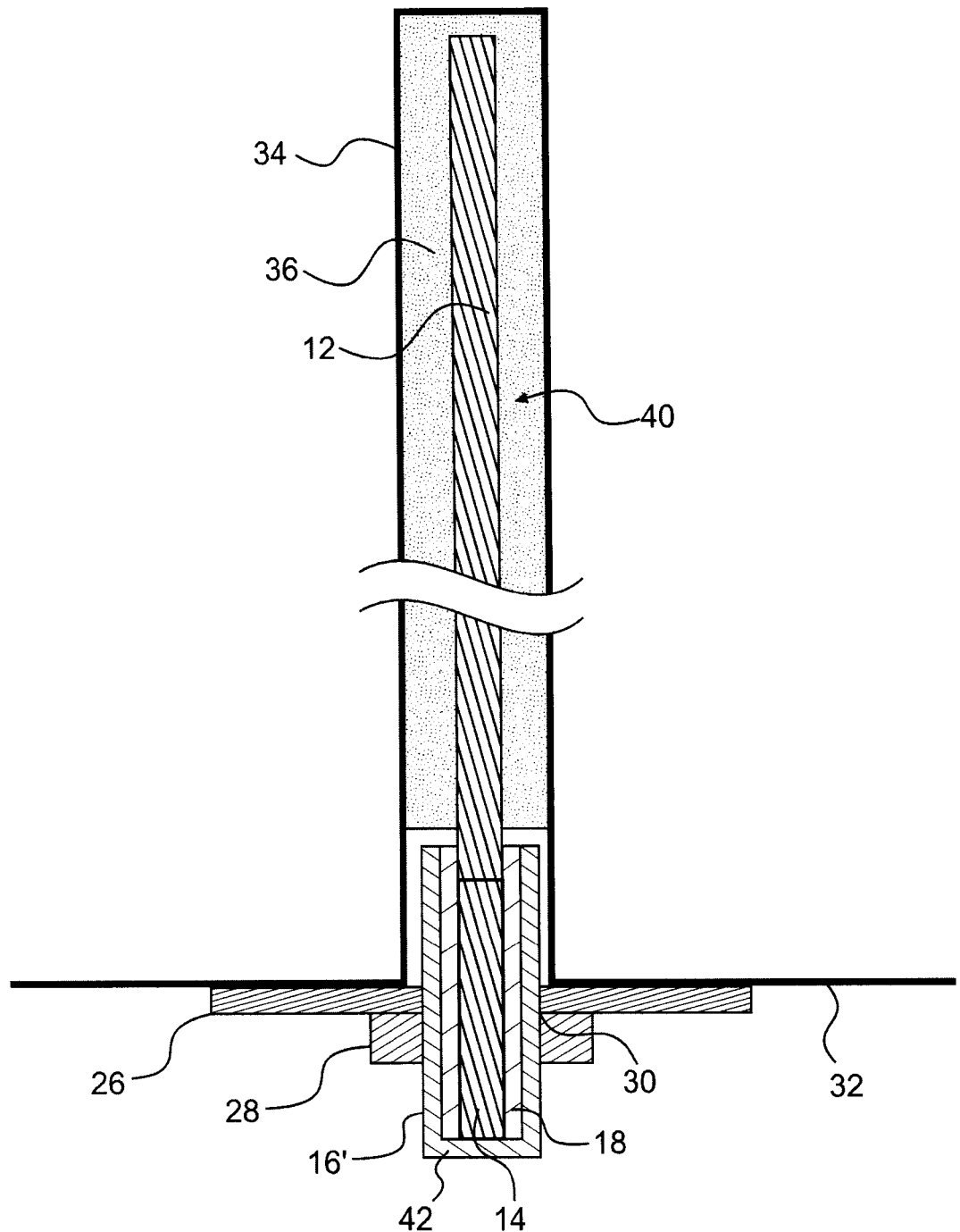
FIG. 7 is a schematic cross-sectional view of an alternative embodiment of a cable bolt according to the present invention installed in a bore hole made in a roof of a mine.

One contemplated method of bonding the cable 12 inside the bore hole 34 for which the present cable bolt 10 is well suited consists in first inserting cartridges, which contain an unsaturated polyester resin and a catalyst inside a casing, inside the bore hole 34. One such type of cartridge is described in U.S. Pat. No. 3,731,791, the entirety of which is incorporated herein by reference. The cable 12 is then pushed inside the bore hole 34 while being spun in order to rupture the casings of the cartridges and mix the resin with the catalyst. This causes the resin to set rapidly, thus bonding the cable 12 to the bore hole 34. As can be seen in FIG. 4, bonding material 36 is also present between the sleeve 16 and the inner surface of the bore hole 34. However, it is contemplated that no bonding material 36 may be provided between the sleeve 16 and the inner surface of the bore hole 34, as shown in the embodiment of FIG. 7. In order to spin the cable 12 as it is being inserted inside the bore hole 34 in the above method, conventional drills such as a stoper or specialized rock bolting equipment can be used to push the cable bolt 10 into the bore hole 34 and engage the nut 28. In order to prevent the nut 28 from turning on the sleeve 16, such that it is the cable 12 that spins, various means are contemplated. The nut 28 could be a lock nut which provides sufficient resistance to turning in order to spin the cable 12 to mix the resin, and which, once the resin has set, can then be turned to complete the installation of the cable bolt 10 as described above. It is also contemplated that a dome nut could be provided on the end of the sleeve 16 to be engaged by the drill. Alternatively, a shear pin can be inserted in the nut 28 and partially in the sleeve 16 to prevent the nut 28 from spinning while spinning the cable 12, and the pin can be broken once the resin has set in order to complete the installation of the cable bolt 10. A second nut could also be fastened on the sleeve 16 such that the nut 28 would prevent its rotation when the second nut contacts the nut 28. As would be understood, the drill would engage the second nut in this case. It is also contemplated that the sleeve 16 could be provided with an interrupted thread. Other methods of installing the cable bolt 10 are also contemplated.

Figure 5:
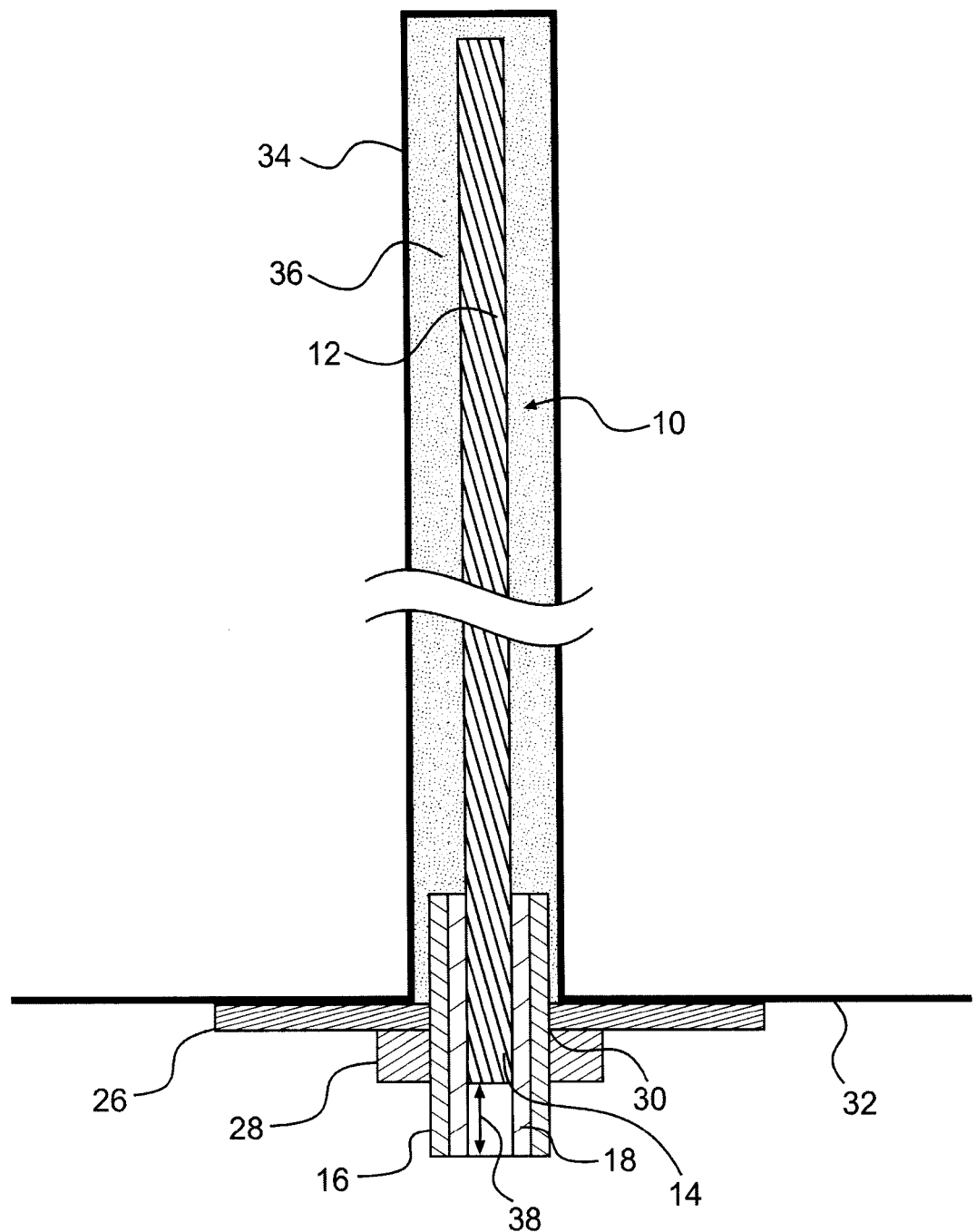
FIG. 5 is a schematic cross-sectional view of the cable bolt of FIG. 1 installed in the bore hole made in the roof of the mine of FIG. 4 after the sleeve has slipped over the cable.

Once installed, the cable bolt 10, via the plate 26, supports the region of the roof surrounding the bore hole 34 and helps to prevent sagging of this region as shown in FIG. 4. When the roof applies a prescribed load on the cable bolt 10, corresponding to a maximum load that can be supported by the cable bolt 10, the cable bolt 10 yields by having the sleeve 16 slip down over the cable 12 as shown in FIG. 5. Since the cable 12 has multiple wires 20 wound around the central wire 22, the wires 20 have the tendency to unwind as the cable 12 slips relative to the sleeve 16. This causes the bonding material 18 to fragment inside the sleeve 16, thus causing additional pressure to take place due to volumetric expansion of the bonding material 18 as it fragments. Thus, after a certain amount of slip, the cable bolt 10 continues to resist tension loads. As will be described below with respect to FIG. 9, the cable bolt 10 can undergo multiple slip events before failing. This feature enhances the ability of the cable bolt 10 to absorb a large amount of energy or external work. The type of cable 12 and bonding material 18, the length of the sleeve 16 (and therefore the length of the end portion 14 bonded to the sleeve), as well as the outer diameter of the cable 12 and the inner diameter of the sleeve 16 will determine the load at which the cable bolt 10 will slip.

As can be seen in FIG. 5, once the sleeve 16 has slipped over the cable 12, the lower end of the cable 12 is disposed inside the sleeve 16. Since the lower end of the sleeve 16 is opened, one can determine if the cable bolt 10 has slipped by simple visual inspection, and the distance by which the cable bolt 10 has slipped can easily be determined by measuring the distance 38 from the lower end of the sleeve 16 to the lower end of the cable 12. The distance 38 is also indicative of the amount of roof sag that has occurred.

Figure 8:
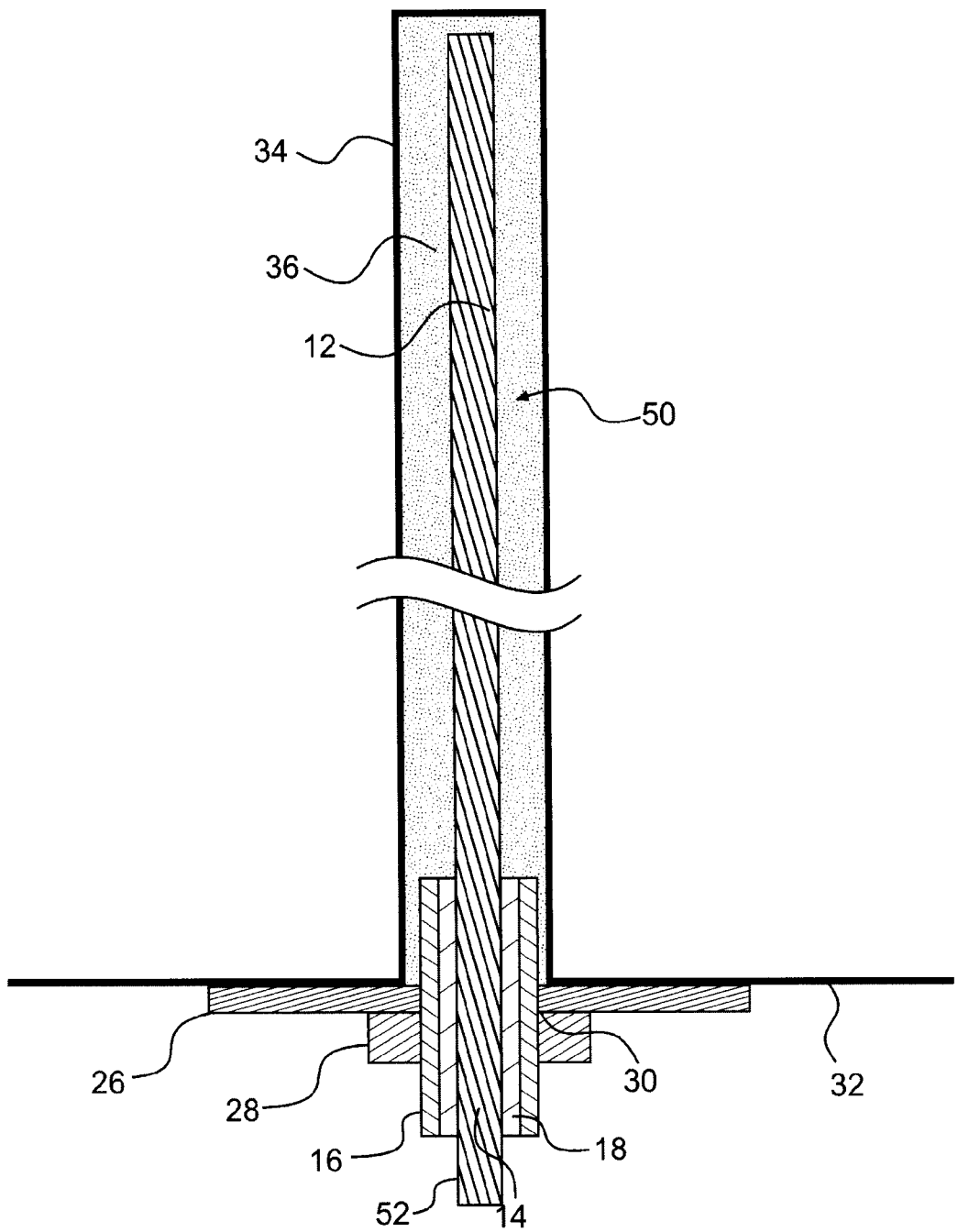
FIG. 8 is a schematic cross-sectional view of another alternative embodiment of a cable bolt according to the present invention installed in a bore hole made in a roof of a mine.

Turning now to FIGS. 7 and 8, two other embodiments of cable bolts (cable bolts 40 and 50 respectively) will be described. For simplicity, elements of the cable bolts 40 and 50 which are similar to those of the cable bolt 10 described above have been labelled with the same reference numbers and will not be described again. Also, the method of installing the cable bolt 10 described above can also be used to install the cable bolts 40 and 50. Therefore, the method of installing the cable bolts 40 and 50 will not be described.

The cable bolt 40 shown in FIG. 7 has a sleeve 16' having a closed end 42. The sleeve 16' is suitable for applications where the amount of slip of the cable bolt 40 does not need to be determined or for applications where the cable bolt 40 is designed to sustain the full tensile strength of the cable 12 as described below. As can be seen, the sleeve 16' is longer than the sleeve 16 of the cable bolt 10. As would be understood, by increasing the length of the sleeve 16', the length of the end portion 14 of the cable 12 that can be bonded to the sleeve 16' can be increased, which in turn increases the strength of the bond. It is therefore contemplated that the bolt head of the cable bolt 40 could be designed such that the shear strength of the bond between the inner surface of the sleeve 16' and the outer surface of the end portion 14 of the multi-strand cable 12 is greater than the tensile strength of the cable 12. In such a design, the cable 12 will fail before the bonding material 18 between the cable 12 and the sleeve 16' fragments, to permit slip. It is contemplated that the cable bolt 10 described above and the cable bolt 50 described below could also be similarly designed to sustain the full tensile strength of the cable 12. Although no bonding material 36 is shown as being provided between the sleeve 16' of the cable bolt 40 and the bore hole 34 in FIG. 7, it is contemplated that bonding material 36 could also be provided in this location.

The cable bolt 50 shown in FIG. 8 has the same elements as the cable bolt 10, however the cable 12 extends below the lower end of the sleeve 16. This embodiment allows the cable bolt 50 to exhibit large displacements while it sustains the applied loads. By knowing the initial length of the extension 52, one can determine the distance by which the cable bolt 50 has slipped by measuring the length of the extension 52. Once the cable bolt 50 has slipped by more than the initial length of the extension 52, the distance by which the cable bolt 50 has slipped can be determined as described above with respect to the cable bolt 10 and by adding the initial length of the extension 52.

Figure 2:
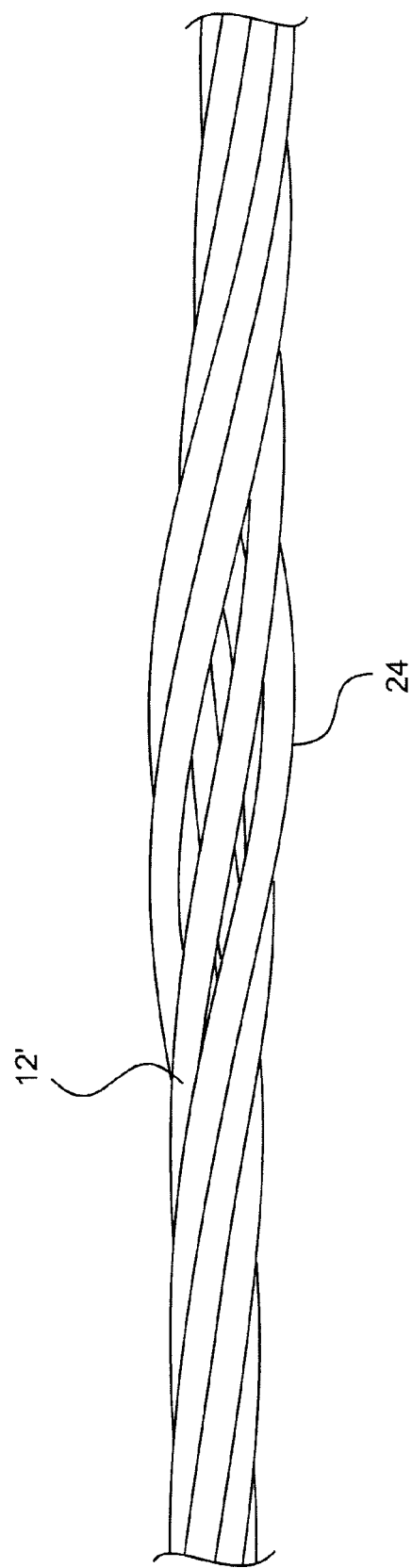
FIG. 2 is side elevation view of a portion of an alternative type of cable to be used in the cable bolt of FIG. 1.
Figure 9:
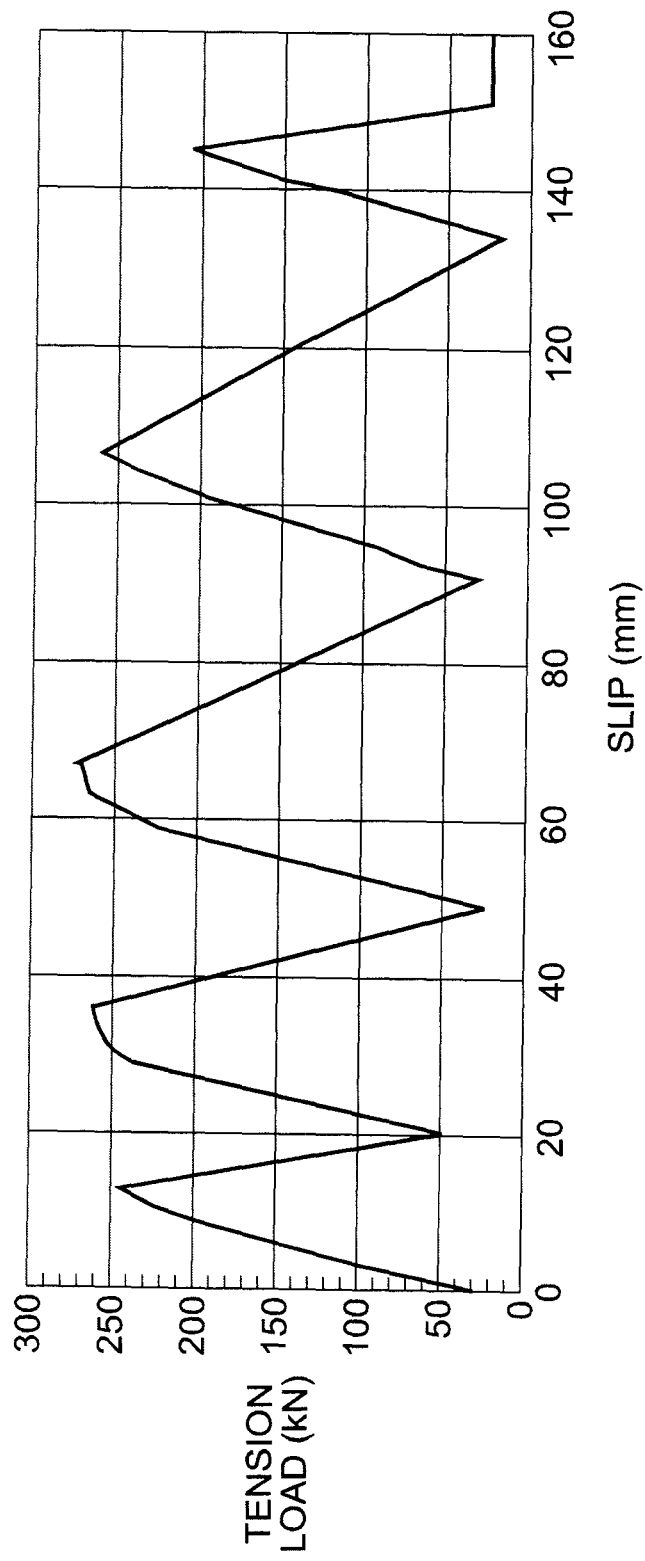
FIG. 9 is a graph illustrating the results of a static pull-out test performed on a cable bolt of the type shown in FIG. 8.
Figure 10:
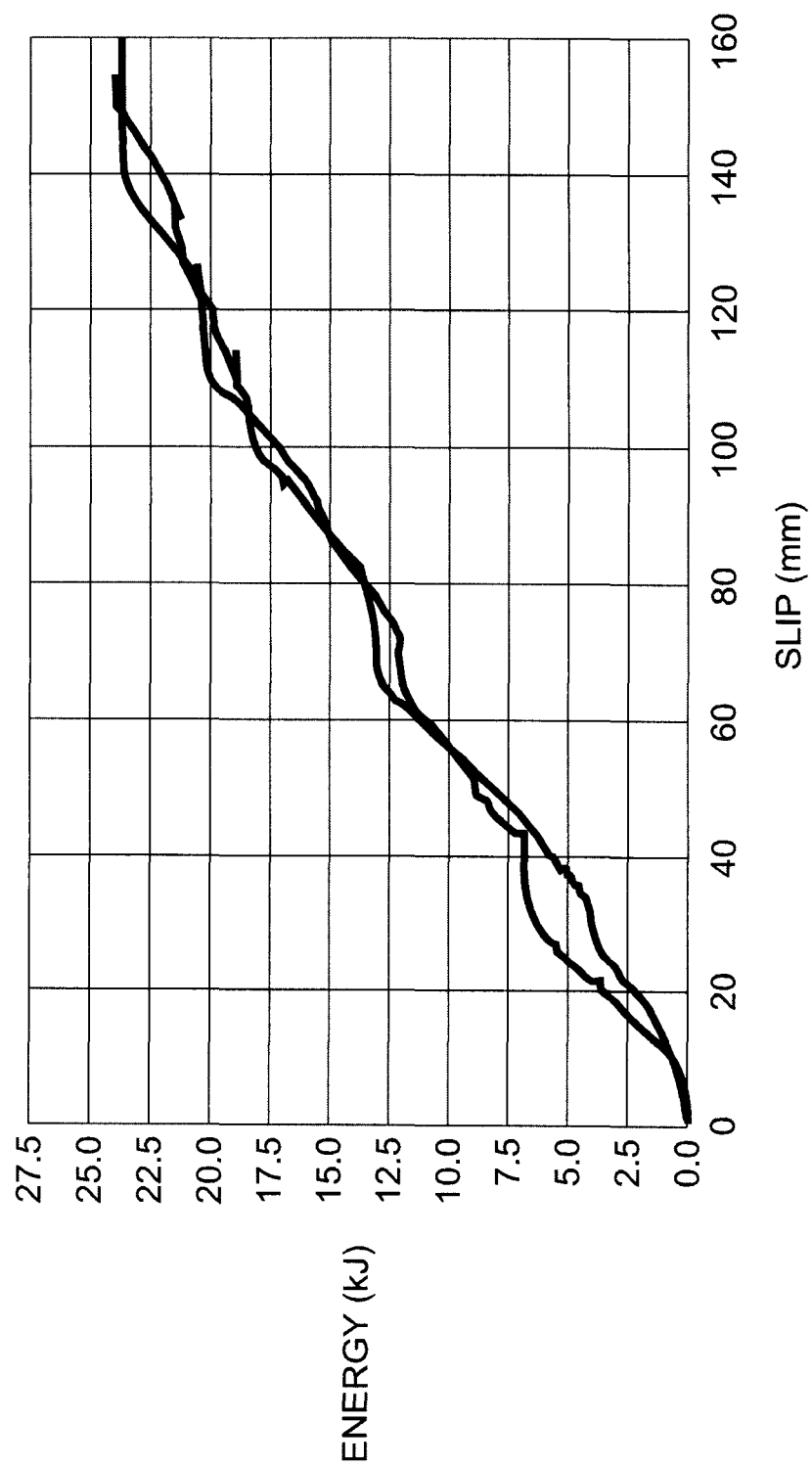
FIG. 10 is a graph illustrating the results of a drop weight test performed on two cable bolts of the type shown in FIG. 8.

Turning now to FIGS. 9 and 10, the results of static and dynamic loading tests performed on cable bolts of the type shown in FIG. 8 (cable bolt 50) will be described. For the tests described below, the bore hole 34 was simulated by a steel tube having a 35 mm inside diameter and a wall thickness of 12 mm. The cable bolts used in the tests described below had a steel sleeve 16 having an inner diameter of 19.1 mm (¾ inch) and a cable 12 having a nominal outer diameter of 15.2 mm (0.6 inch) and being made of seven steel wires (as shown in FIG. 6). The initial length of the extension 52 was of 38.1 mm (1.5 inch). The bonding material 18 used was Betanomit and filled the entire annulus between the sleeve 16 and the end portion 14 of the wire 12. The portion of the cable 12 extending inside the steel tube simulating the bore hole 34 was bulbed as shown in FIG. 2. The bonding material 36 used to bond the cable 12 to the steel tube simulating the bore hole 34 was resin grout. The cable bolts were 1.9 m long.

For the static load test, static load was applied with the help of a hydraulic hollow cylinder having a jacking capacity of 325 kN. The test was conducted in the form of a pull out load applied to the plate 26 of the cable bolt. Tension load was recorded along with slip measured at the sleeve end. FIG. 9 illustrates the test results. The results are presented in terms of cable bolt slip as recorded from the sleeve end versus the applied tension load. The results show a first peak tension load of 241 kN at a slip of 12.5 mm. Upon reloading, the cable bolt quickly regains its strength and withstands further tension load to a second peak of 260 kN at which the recorded slip is 36 mm. As the cable bolt is pulled further, it reloads the tension load to a third peak of 267 kN and a slip of 67 mm. A fourth peak of 261 kN is recorded at a slip of 106 mm and a fifth and final peak is recorded at a load of 211 kN at a slip of 145 mm.

The dynamic load test was conducted by subjecting the cable bolt to the impact load or energy resulting from the free fall of steel block having a mass of 1784 kg from a height of 1.14 m. The applied (external) impact energy in this case is 20 kJ. FIG. 10 shows typical results of the 20 kJ drop weight (dynamic) test. The results are presented in terms of energy in kJ versus slip in mm. As can be seen, the cable bolts used in the tests can sustain 20 kJ of impact energy. In a different test sequence (the results of which are not shown), the cable bolt sustained at least 250 kN of static tension load following a 15 kJ impact energy.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A cable bolt comprising:
   a multi-strand cable;
   a sleeve having at least one open end, the sleeve having an outer surface and an inner cylindrical surface, the outer surface being at least partially threaded, an end portion of the multi-strand cable being disposed inside the sleeve; and
   an expansive bonding material disposed between the inner cylindrical surface of the sleeve and an outer surface of the end portion of the multi-strand cable, the bonding material bonding the inner cylindrical surface of the sleeve to the multi-strand cable.

2. The cable bolt of claim 1, further comprising:
   a plate having an aperture, the sleeve being disposed inside the aperture of the plate; and
   an internally threaded fastener engaging the at least partially threaded outer surface of the sleeve, the plate being disposed between the internally threaded fastener and a surface to be supported by the cable bolt when the cable bolt is installed.

3. The cable bolt of claim 2, wherein, when the cable bolt is installed, the internally threaded fastener biases the plate against the surface to be supported by the cable bolt to tension the cable bolt.

4. The cable bolt of claim 2, wherein the internally threaded fastener is a nut.

5. The cable bolt of claim 1, wherein the bonding material is expansive cement.

6. The cable bolt of claim 1, wherein the bonding material undergoes volumetric expansion while setting.

7. The cable bolt of claim 1, wherein the sleeve has two open ends.

8. The cable bolt of claim 1, wherein the multi-strand cable extends through both ends of the sleeve.

9. The cable bolt of claim 1, wherein the sleeve has one open end and one closed end; and
   wherein the end portion of the multi-strand cable disposed inside the sleeve includes an end of the multi-strand cable.

10. The cable bolt of claim 1, wherein the sleeve slips over the multi-strand cable upon application of a prescribed load on the plate; and
    wherein, following the slipping of the sleeve, the bonding material fragments and applies pressure between the sleeve and the multi-strand cable thereby retaining the sleeve on the multi-strand cable, the applied pressure resisting a further load being applied on the plate.

11. The cable bolt of claim 10, wherein an end of the multi-strand cable is disposed inside the sleeve once the sleeve has slipped.

12. The cable bolt of claim 1, wherein a shear strength of a bond between the inner surface of the sleeve and the outer surface of the end portion of the multi-strand cable is greater than a tensile strength of the cable.

13. The cable bolt of claim 1, wherein the outer surface of the sleeve is fully threaded.

14. The cable bolt of claim 1, wherein the bonding material is disposed between the entire inner cylindrical surface of the sleeve and the entire outer surface of the end portion of the multi-strand cable disposed inside the sleeve.

15. The cable bolt of claim 1, wherein the outer surface of the sleeve is cylindrical.

16. The cable bolt of claim 1, wherein the end portion of the multi-strand cable is prepared by surface roughening.

17. The cable bolt of claim 1, wherein the end portion of the multi-strand cable is prepared by sandblasting.

* * * * *